(12) United States Patent
Annampedu et al.

(10) Patent No.: US 8,817,867 B1
(45) Date of Patent: Aug. 26, 2014

(54) ADAPTIVE CONTINUOUS TIME LINEAR EQUALIZER

(71) Applicant: LSI Corporation, San Jose, CA (US)

(72) Inventors: Viswanath Annampedu, Schnecksville, PA (US); Amaresh V. Malipatil, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/803,435

(22) Filed: Mar. 14, 2013

Related U.S. Application Data

(60) Provisional application No. 61/777,115, filed on Mar. 12, 2013.

(51) Int. Cl.
H03H 7/30 (2006.01)
(52) U.S. Cl.
USPC .......................................................... 375/233
(58) Field of Classification Search
CPC .................... H04L 25/03057; H04L 25/03885
USPC .......................................................... 375/233
See application file for complete search history.

(56) References Cited

U.S. PATENT DOCUMENTS

| 7,266,145 | B2 | 9/2007 | Balasubramonian et al. | 375/232 |
|---|---|---|---|---|
| 7,421,021 | B2 | 9/2008 | Balasubramonian et al. | 375/232 |
| 7,764,732 | B2 | 7/2010 | Rollins et al. | 375/233 |
| 7,801,257 | B2 | 9/2010 | Eglit | 375/355 |
| 8,081,677 | B2 | 12/2011 | Badalone | 375/233 |
| 2009/0051458 | A1 | 2/2009 | Miller et al. | 333/18 |
| 2010/0046598 | A1* | 2/2010 | Zhong et al. | 375/233 |
| 2011/0063151 | A1* | 3/2011 | Hojabri et al. | 341/122 |
| 2012/0013494 | A1* | 1/2012 | Song | 341/122 |
| 2012/0076181 | A1* | 3/2012 | Aziz et al. | 375/219 |
| 2012/0128053 | A1* | 5/2012 | Witt | 375/232 |
| 2012/0183025 | A1* | 7/2012 | Manickam et al. | 375/222 |
| 2012/0230383 | A1 | 9/2012 | Currivan et al. | 375/232 |
| 2012/0230385 | A1 | 9/2012 | Currivan et al. | 375/233 |
| 2014/0050260 | A1* | 2/2014 | Cyrusian | 375/233 |

OTHER PUBLICATIONS

Aziz, Perves M. et al., "Adaptation Algorithms for a Class of Continuous Time Analog Equalizers With Application to Serial Links", 2011 IEEE, pp. 1383-1386.

* cited by examiner

Primary Examiner — Juan A Torres
(74) Attorney, Agent, or Firm — Christopher P. Maiorana, PC

(57) ABSTRACT

An apparatus comprising an equalizer circuit, a converter circuit and an adaptation circuit. The equalizer circuit may be configured to generate an intermediate signal in response to an input signal and a gradient value. The converter circuit may be configured to generate a digital signal comprising a plurality of symbol values, including a main cursor symbol value, in response to the intermediate signal. The adaptation circuit may be configured to generate the gradient value in response to a plurality of the symbol values before the main cursor symbol value, a plurality of symbol values after the main cursor symbol value, and an error value.

12 Claims, 5 Drawing Sheets $$w_i(m+1) = w_i(m) + \mu_w e(n) y^s(n-i)$$

FIG. 3

$$k(m+1) = k(m) + \mu_k e(n)\left(\sum_{i=0}^{i_{main}-1} g_i y^s(n-i) + \sum_{i=i_{main}+1}^{N-1} g_i y^s(n-i)\right)$$

FIG. 4

ADAPTIVE CONTINUOUS TIME LINEAR EQUALIZER

FIELD OF THE INVENTION

The present invention relates to data transmission systems generally and, more particularly, to a method and/or apparatus for adapting a continuous time linear equalizer.

BACKGROUND OF THE INVENTION

Conventional high speed data transfer systems use a serial transmission medium to transfer data. A receiving device receives the data, and converts it to digital data that may be used at the receiving side of the link. Conventional receiving circuits compensate for losses in the transmission medium by providing some sort of equalization. The equalization is often based on less than ideal circumstances, and may or may not be optimized for the transmission medium.

It would be desirable to implement an adaptive process for continuous time linear equalizers.

SUMMARY OF THE INVENTION

The present invention concerns an apparatus comprising an equalizer circuit, a converter circuit and an adaptation circuit. The equalizer circuit may be configured to generate an intermediate signal in response to an input signal and a gradient value. The converter circuit may be configured to generate a digital signal comprising a plurality of symbol values, including a main cursor symbol value, in response to the intermediate signal. The adaptation circuit may be configured to generate the gradient value in response to a plurality of the symbol values before the main cursor symbol value, a plurality of symbol values after the main cursor symbol value, and an error value.

The features and advantages of the present invention include providing an adaptive continuous time linear equalizer that may (i) automatically obtain an optimal peaking amount used by an analog equalizer in a receiver, (ii) automatically track circuit environmental variations such as Process, Voltage and Temperature (PVT) and/or (iii) be easy to implement as a gradient for a least mean square (LMS) adaptive process.

BRIEF DESCRIPTION OF THE DRAWINGS

These and other features and advantages of the present invention will be apparent from the following detailed description and the appended claims and drawings in which:

FIG. 3 is a diagram of an adaptation equation of a feed forward equalizer;

FIG. 4 is a diagram of an adaptation equation of an analog linear equalizer;

DETAILED DESCRIPTION OF THE PREFERRED EMBODIMENTS

Figure 1:
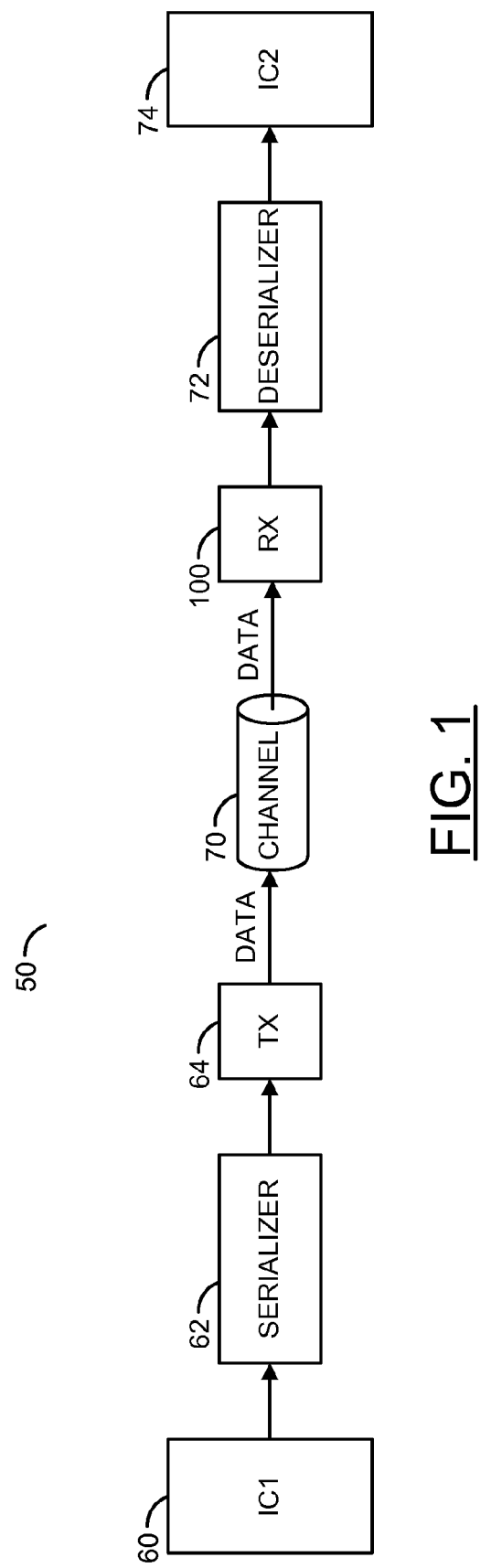
FIG. 1 is a diagram of a context of an embodiment of the invention.

Referring to FIG. 1, a block diagram of a circuit 50 is shown in accordance with an embodiment of the present invention. The circuit 50 shows a high speed link configuration. The circuit generally comprises a block (or circuit) 60, a block (or circuit) 62, a block (or circuit) 64, a block (or channel) 70, a block (or circuit) 72, a block (or circuit) 74, and a block (or circuit) 100. The circuit 60 may be implemented as a first integrated circuit (or chip). The circuit 62 may be implemented as a serializer circuit. The circuit 64 may be implemented as a transmitter circuit. The channel 70 may be implemented as a transmission medium, such as a fiber optic channel, coax cable, etc. The circuit 72 may be implemented as a deserializer circuit. The circuit 74 may be implemented as a second integrated circuit (or chip). The circuit 100 may be implemented as a receiver circuit. The circuit 100 may provide adaptive continuous time linear equalization.

Dispersive channels with inter Symbol Interference (ISI) are encountered in many signal processing and/or communication applications. The high speed serial link of the channel 70 is an example of such applications. The channel 70 may be used to transfer voice, data, video, etc. over lossy channels such as coax, network back-planes, optical fibers and other transmission media. The channel 70 may support ultra high speeds (e.g., as high as 40 Giga Bits Per Seconds (Gbps)) using current technologies. The channel 70 may form part of a high speed communication link between the integrated circuit 60 and the integrated circuit 74. The circuit 62 may be a SerDes (Serializer De-Serializer) circuit. The circuit 60 may generate serialized blocks of parallel data received from the chip 60. The data may be transmitted over the communication channel 70. The circuit 72 may de-serialize the data into parallel data to be read by the chip 74. Due to limited bandwidth of the communication channel 70, inter symbol interference (ISI) can occur and degrade the quality of the signal at the receiver end. Advanced signal shaping analog linear equalizer filters are typically used at the receiver 100 to handle ISI and/or to decode the signal properly at the receiver. The loss at Nyquist frequency (half of the baud rate) is an indicator of degradation in signal quality. To compensate for the loss, signal peaking (amplification) is provided around the Nyquist frequency by the circuit 100. Rather than manually programming a fixed peaking value, the circuit 100 provides an adaptive process to automatically arrive at an optimal peaking value needed by the channel 70. Since the process is adaptive, the circuit 100 also provides a way to handle environmental variations of the circuit such as Process, Voltage and Temperature (PVT).

Figure 2:
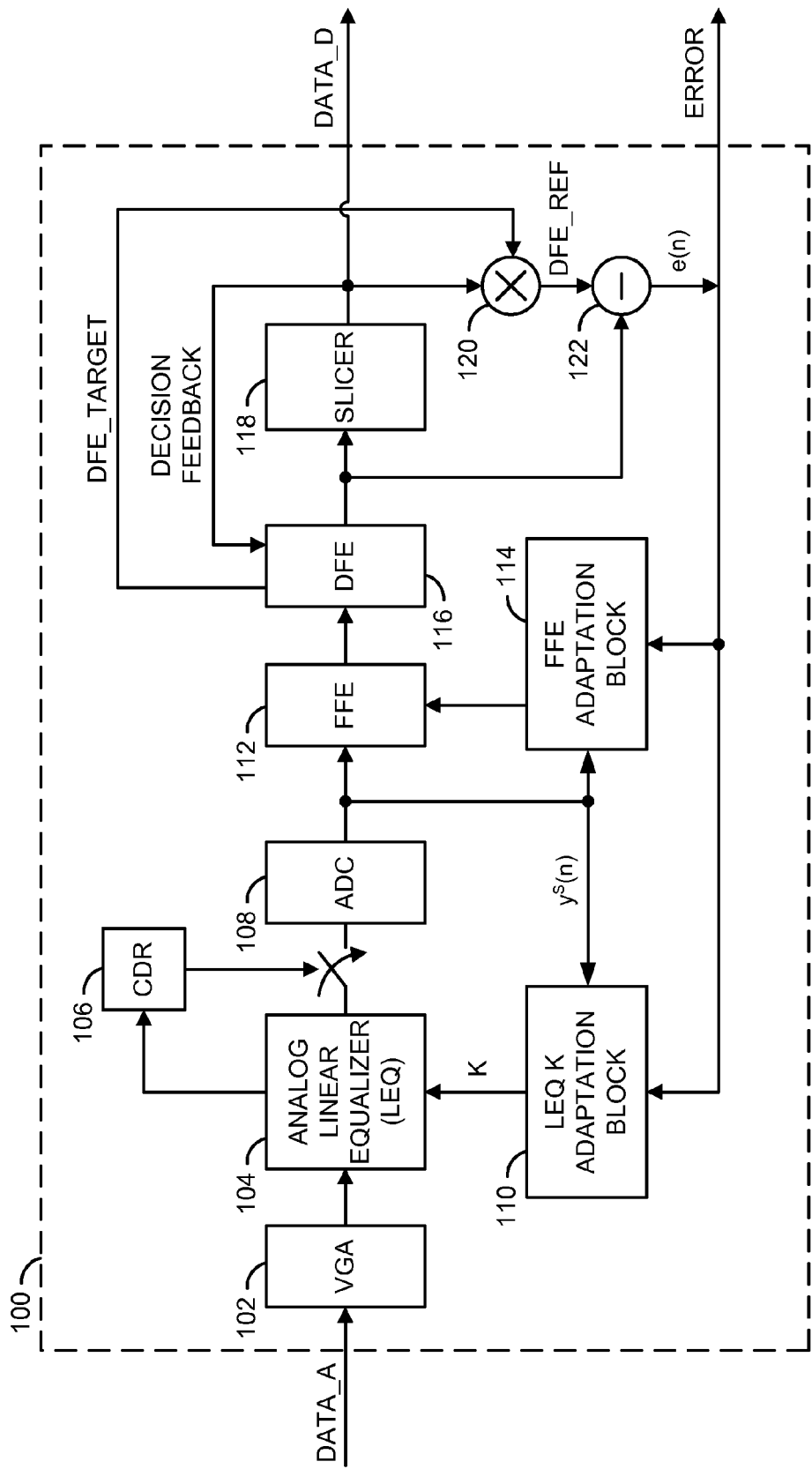
FIG. 2 is a detailed diagram of the receiver of FIG. 1.

Referring to FIG. 2, a more detailed diagram of the receiver circuit 100 is shown. The receiver 100 illustrates how to adapt the analog LEQ for obtaining a desired signal peaking. The circuit 100 generally comprises a block (or circuit) 102, a block (or circuit) 104, a block (or circuit) 106, a block (or circuit) 108, a block (or circuit) 110, a block (or circuit) 112, a block (or circuit) 114, a block (or circuit) 116, a block (or circuit) 118, a block (or circuit) 120, and a block (or circuit) 122. The circuit 102 may be implemented as a variable gain amplifier (VGA) circuit. The circuit 104 may be implemented as an equalizer. In one example, the circuit 104 may be implemented as an analog linear equalizer (LEQ). The circuit 106 may be implemented as a CDR circuit. The circuit 108 may be implemented as an analog to digital conversion (ADC) circuit. The circuit 110 may be implemented as an adaptation circuit. The circuit 112 may be implemented as a feed forward equalization (FFE) circuit. The circuit 114 may be implemented as a feed forward equalization adaptation circuit. The circuit 116 may be implemented as a decision feedback equalization (DFE) circuit. The circuit 118 may be implemented as a slicer circuit. The circuit 120 may be implemented as a summing circuit. The circuit 122 may also be implemented as a summing circuit.

The circuit 100 may receive a signal (e.g., DATA_A), and may present a signal (e.g., DATA_D). In general, the circuit 100 receives an analog signal DATA_A and generates a digital signal (e.g., DATA_D). The signal DATA_A passes through the analog variable gain amplifier 102 to modify the signal to occupy the full dynamic range of the ADC circuit 108. The linear equalizer 104 may provide signal shaping before phase adjustments by the clock-data recovery circuit 106 and/or before being quantized by the analog to digital converter circuit 108.

An example of the analog linear equalization gain adaptation is shown in the equation of FIG. 4. The circuit 110 may calculate an optimal K value based on the needs of the communication channel 70. A number of digital samples from the ADC circuit 108 (e.g., $y^s(n)$) follow the signal processing path of feed-forward equalizer circuit 112 and the decision feedback equalizer circuit 116 before getting sliced by the circuit 118 to decode the received data. The digital samples $y^s(n)$ are also sent to the circuit 110 and to the circuit 114. The signal ERROR (or e(n)) is computed as a DFE reference value (e.g., DFE_REF) minus the output of the DFE circuit 116. The value "n" may be the time index in the signal e(n) and/or the signal $y^s(n)$. In general, the signal ERROR and the signal e(n) are the same signal. The time index n is not shown explicitly in the signal ERROR. The signal DFE_REF is the product of detected symbols from the slicer circuit 118 and a signal (e.g., DFE_TARGET) generated by the DFE circuit 116.

The adaptation gradient for LEQ K is shown in the equation of FIG. 4. The adaptation gradient is the product of the signal ERROR and the sum of the detected ADC output pre and post cursor symbols. Mathematical notations and/or relationships of the new LEQ K gradient compared to the FFE gradient and/or LMS update equations are also given in FIG. 4.

Figure 5:
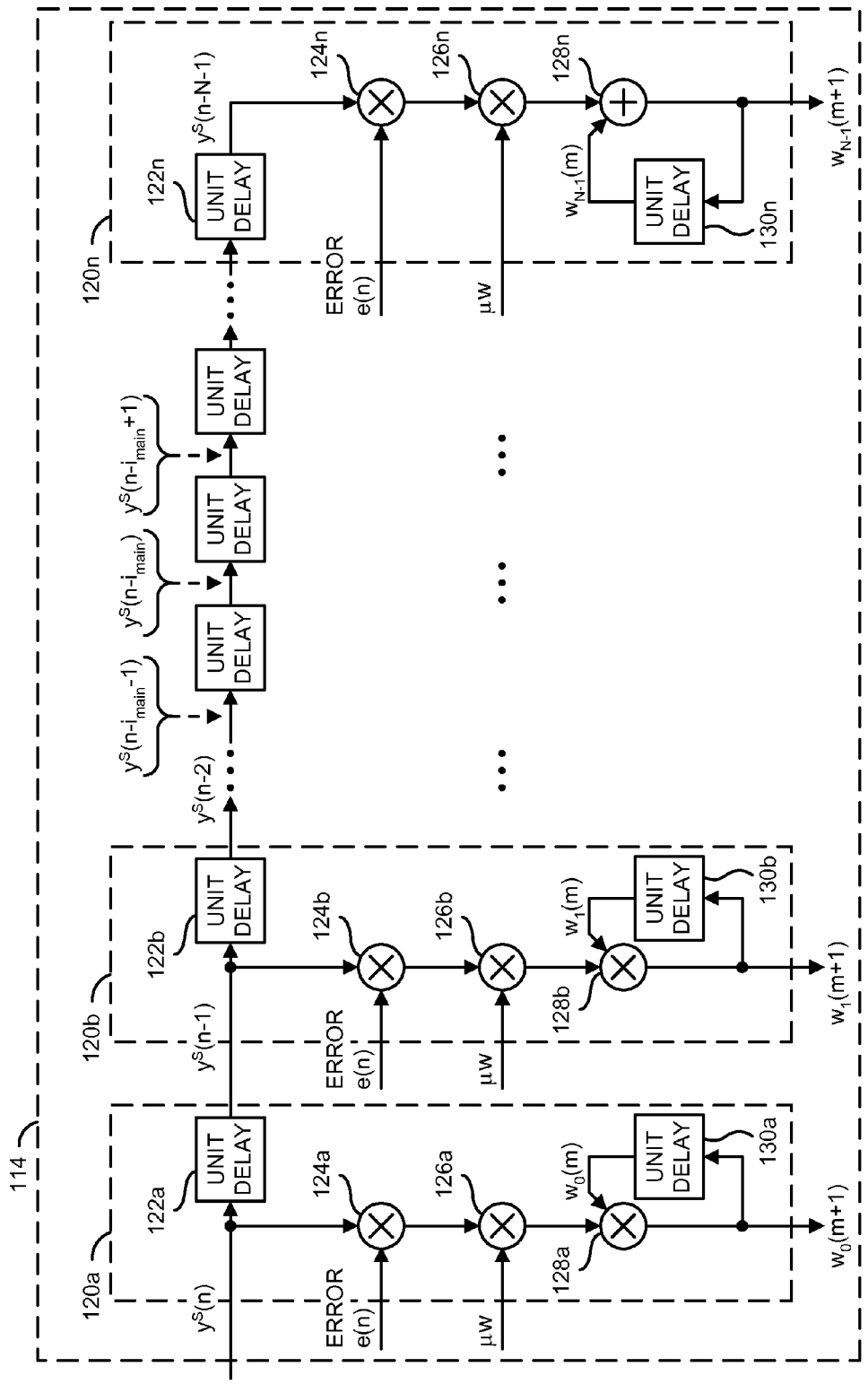
FIG. 5 is a detailed diagram of the feed-forward equalization adaptation circuit of FIG. 3.

Referring to FIG. 5, details of the circuit 114 are shown. The circuit 114 generally comprises a number of blocks (or circuits) 120a-120n. The circuit 120a generally comprises a block (or circuit) 122a, a block (or circuit) 124a, a block (or circuit) 126a, a block (or circuit) 128a, and a block (or circuit) 130a. The circuit 122a may be implemented as a delay circuit configured to generate a unit of delay. The circuit 124a may be implemented as a multiplication circuit. The circuit 126a may be implemented as a multiplication circuit. The circuit 128a may be implemented as a multiplication circuit. The circuit 130a may be implemented as a delay circuit configured to generate a unit of delay. The particular value of the unit of delay may be varied to meet the design criteria of a particular implementation. The circuit 124a may receive the signal e(n). The circuit 124a may multiply the signal e(n) by the signal $y^s(n)$. The circuit 128a may multiply the output of the circuit 124a by the signal Mw. The circuit 128a may multiply the output of the circuit 126a by the output of the circuit 130a. The overall output of the circuit 120a may be $w_0(m+1)$. The output of the delay unit 122a may be $y^s(n-1)$. Each of the circuits 120a-120n may provide a similar implementation.

Figure 6:
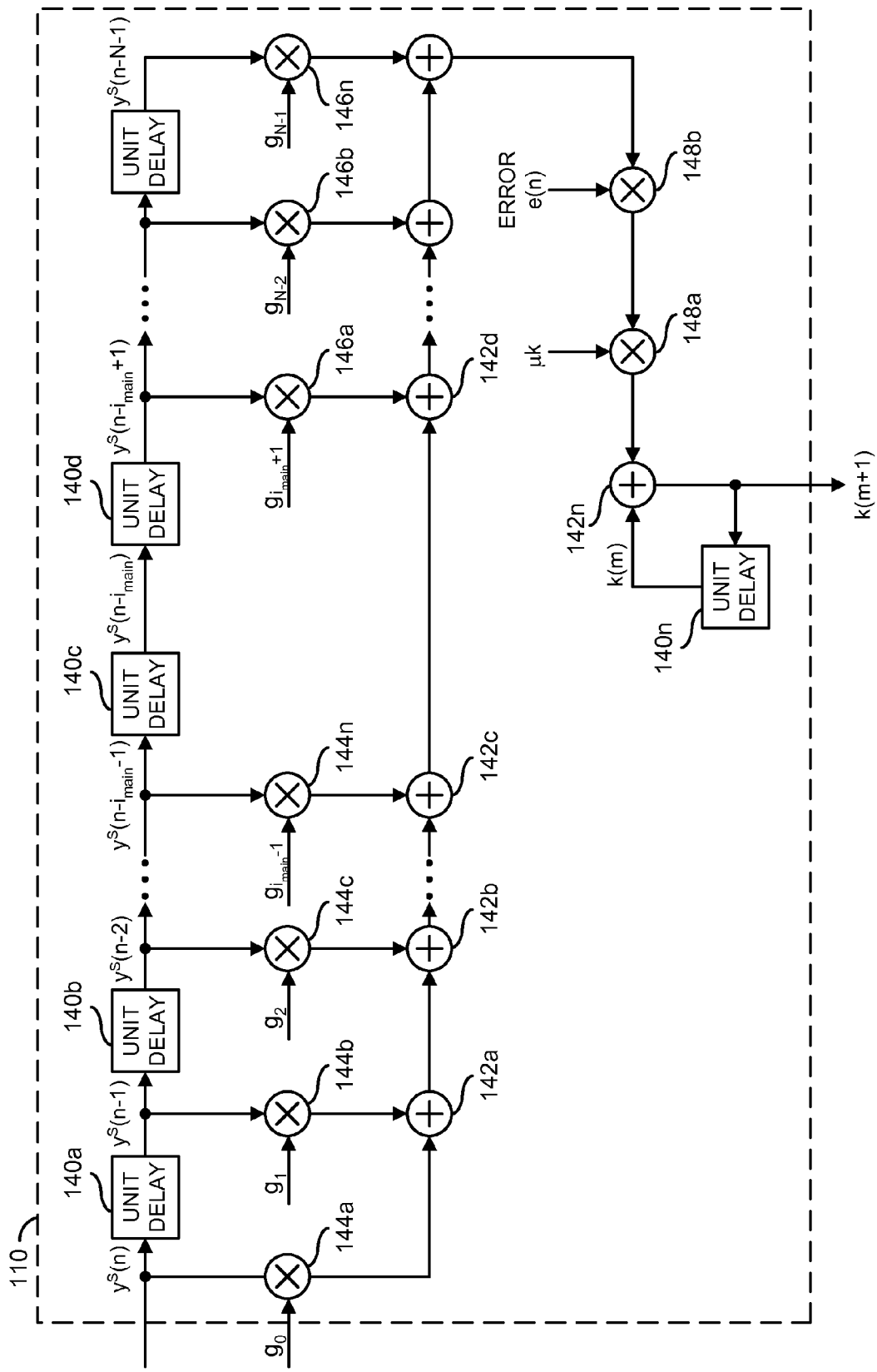
FIG. 6 is a detailed diagram of the analog linear equalizer adaptation circuit of FIG. 3.

Referring to FIG. 6, a more detailed diagram of the circuit 110 is shown. The circuit 110 generally comprises a number of blocks (or circuits) 140a-140n, and a number of blocks 142a-142n, a number of blocks (or circuits) 144a-n, a number of blocks (or circuits) 146a-n, a block (or circuit) 148a, and a block (or circuit) 148b. The circuits 140a-140n may be implemented as delay circuits configured to generate a unit of delay. The circuits 142a-142n may be implemented as multiplication circuits. The circuits 144a-144n may be implemented as pre-cursor multipliers. The circuits 146a-146n may be implemented as post-cursor multipliers. The circuits 148a and 148b may be implemented as a summing circuits. In general, each of the circuits 140a-140n adds a unit of delay to the signal. The values $y^s(n)$ to $y^s(n-i_{main}-1)$ represent the pre-cursor ADC symbols. The values $y^s(n-i_{main}-1)$ to $y^s(n-1)$ represent the post cursor ADC symbols. The value $y^s(n-i_{main})$ corresponds to the main cursor ADC symbol. The value $y^s(n-i_{main})$ is not used in the equation in FIG. 4.

The LEQ K adaptation circuit 110 provides a value of K that converges even when the FFE adaptation circuit 114 is non-adaptive (e.g., by setting the update gain of the FFE adaption circuit 114 to a value of 0) and/or acts like an all-pass filter (e.g., by setting all the tap weights (except the main tap) in the FFE circuit 112 to a value of zero. The location of the main tap of the FFE circuit 112 may be varied. For example, by having the main tap as the first or last FFE tap, and/or with other tap weights set to a value of zero in the FFE circuit 112, and/or by setting the update gain of the FFE adaption circuit 114 to a value of zero, the FFE circuit 112 can be configured as a non-adaptive all pass filter with a constant group delay. In such a case, the LEQ circuit 104 will act as the only signal shaping filter.

An FFE adaptation equation is of the form of the equation shown in FIG. 3 where e(n) is DFE out Error and $y^s(n-i)$ is ADC Out Symbols for $i^{th}$ FFE tap.

The LEQ K adaptation equation to generate the gradient for adapting K is shown in FIG. 4. The LEQ K adaptation gradient is the sum of ADC Output pre and post cursor symbols multiplied by the DFE output signal ERROR. In the equation of FIG. 4, the value $i_{main}$ corresponds to the main (largest) FFE tap and N corresponds to the total number of FFE taps.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   an equalizer circuit configured to generate an intermediate signal in response to (i) an input signal and (ii) a gradient value;
   a converter circuit configured to generate a digital signal comprising a plurality of symbol values, including a main cursor symbol value, in response to said intermediate signal; and
   an adaptation circuit configured to generate said gradient value in response to (i) a plurality of said symbol values before said main cursor symbol value, (ii) a plurality of symbol values after said main cursor symbol value, and (iii) an error value.

2. The apparatus according to claim 1, wherein said adaptation circuit provides adaptation of a continuous time linear equalization.

3. The apparatus according to claim 1, wherein said plurality of symbol values are presented to a feed-forward equalizer.

4. The apparatus according to claim 1, wherein said converter circuit comprises an analog to digital converter circuit.

5. The apparatus according to claim 3, wherein an output of said feed-forward equalizer is presented to a decision feedback equalization (DFE) circuit configured to generate a target value.

6. The apparatus according to claim 5, wherein an output of said decision feedback equalization circuit is presented to a slicer circuit.

7. The apparatus according to claim 5, wherein said apparatus operates even when said feed-forward equalizer operates as an all pass filter.

8. The apparatus according to claim 6, wherein said slicer circuit generates a decision feedback signal.

9. The apparatus according to claim 8, wherein said decision feedback equalization circuit generates said target value in response to said decision feedback signal and said output of said feed-forward equalizer.

10. The apparatus according to claim 9, wherein a multiplier generates a decision reference signal in response to said target value and said decision feedback signal.

11. The apparatus according to claim 10, wherein said error value comprises a difference between said decision reference signal and said output of said decision feedback equalization circuit.

12. A method for implementing a continuous time linear equalizer, comprising the steps of:
   (A) generating an intermediate signal in response to (i) an input signal and (ii) a gradient value;
   (B) generate a digital signal comprising a plurality of symbol values, including a main cursor symbol value, in response to said intermediate signal; and
   (C) generating said gradient value in response to (i) a plurality of said symbol values before said main cursor symbol value, (ii) a plurality of symbol values after said main cursor symbol value, and (iii) an error value.

* * * * *